United States Patent
Schwery et al.

(10) Patent No.: US 8,643,248 B2
(45) Date of Patent: Feb. 4, 2014

(54) ELECTRICAL MACHINE WITH A RESTRAINT SYSTEM FOR A ROTOR WINDING HEAD

(75) Inventors: Alexander Schwery, Kuettigen (CH); Serdar Cifyildiz, Winterthur (CH); Matthias Schmid, Birmenstorf (CH)

(73) Assignee: Alstom Renewable Technologies, Grenoble (FR)

( * ) Notice: Subject to any disclaimer, the term of this patent is extended or adjusted under 35 U.S.C. 154(b) by 83 days.

(21) Appl. No.: 13/275,438

(22) Filed: Oct. 18, 2011

(65) Prior Publication Data
US 2012/0146450 A1  Jun. 14, 2012

Related U.S. Application Data

(63) Continuation of application No. PCT/EP2010/055111, filed on Apr. 19, 2010.

(30) Foreign Application Priority Data

Apr. 24, 2009 (DE) .......................... 10 2009 018 552
Aug. 20, 2009 (DE) .......................... 10 2009 037 989

(51) Int. Cl.
- *H02K 1/22* (2006.01)
- *H02K 3/46* (2006.01)
- *F16B 31/02* (2006.01)
- *F16B 21/04* (2006.01)

(52) U.S. Cl.
USPC ........... 310/261.1; 310/270; 73/761; 411/555

(58) Field of Classification Search
USPC .................. 310/261.1, 270; 73/761; 411/555
See application file for complete search history.

(56) References Cited

U.S. PATENT DOCUMENTS

| | | | |
|---|---|---|---|
| 2,293,581 A * | 8/1942 | Whitesell, Jr. ................ 411/555 |
| 3,648,749 A | 3/1972 | Warren | |
| 3,820,381 A | 6/1974 | Thurston | |
| 4,415,825 A | 11/1983 | Dailey et al. | |
| 8,049,393 B2 | 11/2011 | Schwery et al. | |
| 2007/0017295 A1* | 1/2007 | Ohta et al. ..................... 73/761 |

FOREIGN PATENT DOCUMENTS

| | | |
|---|---|---|
| CH | 572166 A5 | 1/1976 |
| DE | 1488018 A1 | 4/1969 |
| DE | 1488018 A1 * | 4/1969 |

(Continued)

OTHER PUBLICATIONS

Machine Translation DE19535700 (1997) and DE1488018 (1969) JP8172284 (1996).*
European Patent Office, International Search Report in International Patent Application No. PCT/EP2010/055111 (mailed Oct. 1, 2010).

*Primary Examiner* — Tran Nguyen
*Assistant Examiner* — Jose Gonzalez Quinones
(74) *Attorney, Agent, or Firm* — Buchanan Ingersoll & Rooney PC

(57) ABSTRACT

An electrical machine configured to operate in a power range of several MVA includes a rotor configured to rotate about an axis. The rotor includes a rotor winding disposed in a rotor lamination stack and having an exposed winding head outside of the rotor lamination stack. The winding head includes a winding head retention system having a plurality of radially oriented retention elements each including a locking device configured to secure a respective one of the retention elements against at least one of an unintentional loosening and a flying away in an event of a breakage.

10 Claims, 3 Drawing Sheets

(56) References Cited

FOREIGN PATENT DOCUMENTS

| | | | |
|---|---|---|---|
| DE | 19535700 A1 | * | 3/1997 |
| EP | 1936210 A1 | | 6/2008 |
| GB | 191014680 A | | 0/1911 |
| JP | 59110358 A | * | 6/1984 |
| JP | 08172284 A | * | 7/1996 |
| WO | WO 2008119661 A1 | * | 10/2008 |

* cited by examiner

ELECTRICAL MACHINE WITH A RESTRAINT SYSTEM FOR A ROTOR WINDING HEAD

CROSS REFERENCE TO PRIOR APPLICATIONS

This is a continuation of International Patent Application No. PCT/EP2010/055111, filed on Apr. 19, 2010, which claims priority to German Application Nos. DE 10 2009 018 552.6, filed on Apr. 24, 2009, and DE 10 2009 037 989.4, filed on Aug. 20, 2009. The entire disclosure of each of the applications is hereby incorporated by reference herein.

FIELD

The present invention relates to the field of electrical machines.

BACKGROUND

Double-fed asynchronous machines in the power range from 20 MVA to 500 MVA can be used for variable-speed energy production. These machines are distinguished by a distributed three-phase winding on the rotor. The rotor winding consists of individual bars which are embedded in slots in the rotor laminations. The individual bars are connected in the winding head to form a winding. The arrangement of the bar connections is uniformly distributed around the circumference. As a result of the rotation of the rotor, the winding heads are subjected to centrifugal forces, against which they have to be mechanically secured by means of winding head retention systems. In principle, there are three types of winding head retention systems:
1. Fixing by means of a steel cap, as is the case with turbogenerators.
2. Fixing wherein a steel cable, wire or plastic film is wrapped around the whole winding head.
3. Fixing by means of bolts, screws or U-shaped brackets.

Such an asynchronous machine 10 is reproduced in section in highly simplified form in FIG. 1. It comprises a rotor 19 which can be rotated about an axis 18 and is encompassed concentrically by a stator lamination stack 14 with corresponding stator winding and a stator winding head 17. The rotor 19 comprises a central body 11 which merges with a shaft 11' at each end. The central body 11 is surrounded by a rotor lamination stack 12 in which the rotor winding 13 runs. Slip rings 15, which are used to supply the rotor winding 13 with current, are arranged on one of the shafts 11'. The rotor winding head 16, which is shown once more enlarged in vertical orientation in FIG. 2(*a*), is equipped with a winding head retention system 29 which, according to FIG. 2(*a*), is fitted with retention elements which run radially through the rotor winding head 16 in the form of threaded rods 20 or threaded bolts or similar, and which are fitted with nuts 21.

The retention elements 20, 21 absorb the centrifugal forces acting on the rotor winding head 16 during the operation of the machine and pass them into the solid part of the rotor arranged below the winding head. It can now come about that the heavily mechanically loaded retention elements 20, 21 break or lose their mechanical integrity in some other manner during operation over a longer period. However, it may also be that the nuts 21 or screw fittings come loose and in this way the function of the retention elements 20, 21 is lost. If, as part of this failure, some of the retention elements 20, 21 come loose and are flung outwards, the machine can incur consequential damage which leads to extended downtime of the machine and therefore to high consequential costs.

It is desirable to either prevent such a failure of the retention elements 20, 21 altogether or at least keep the consequential damage within limits. Furthermore, it would be of advantage if abnormal changes in the winding head could be detected in good time and the machine could be switched off at an early stage in order to limit damage or to prevent it occurring in the first place.

SUMMARY OF THE INVENTION

In an embodiment, the present invention provides an electrical machine configured to operate in a power range of several MVA including a rotor configured to rotate about an axis. The rotor includes a rotor winding disposed in a rotor lamination stack and having an exposed winding head outside of the rotor lamination stack. The winding head includes a winding head retention system having a plurality of radially oriented retention elements each including a locking device configured to secure a respective one of the retention elements against at least one of an unintentional loosening and a flying away in an event of a breakage.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an electrical machine of the kind mentioned in the introduction so that damage to the rotor winding head due to the centrifugal forces acting can be prevented or at least limited.

An embodiment of the invention includes retention elements provided with locking means which secure the retention elements against unintentional loosening and/or flying away in the event of a breakage.

An embodiment of the invention provides retention elements designed as threaded rods or threaded bolts which extend through the winding head in a radial direction and the outer end of which is provided with a nut or a screw head for supporting the winding head.

In an embodiment, the locking means can comprise a textile locking device which is stretched, particularly in the form of a textile tape, over the outsides of the nuts or screw heads, preferably in close contact therewith and in a circumferential direction.

In an embodiment, the locking means can also comprise a wire locking device which is stretched in the form of a wire over the outsides of the nuts and/or threaded rods or screw heads, preferably in close contact therewith and in a circumferential direction.

In an embodiment, slots, in which the wire locking device, which simultaneously safeguards the retention elements against twisting, is inserted, are preferably provided on the retention elements.

Another embodiment of the invention is distinguished in that the winding head retention system is equipped with monitoring means, with which the proper functioning of the winding head can be monitored.

In an embodiment, the monitoring means preferably comprise strain measuring devices, which measure the mechanical strain of the locking means in the winding head retention system and transmit it to a processing unit for evaluation.

Figure 1:
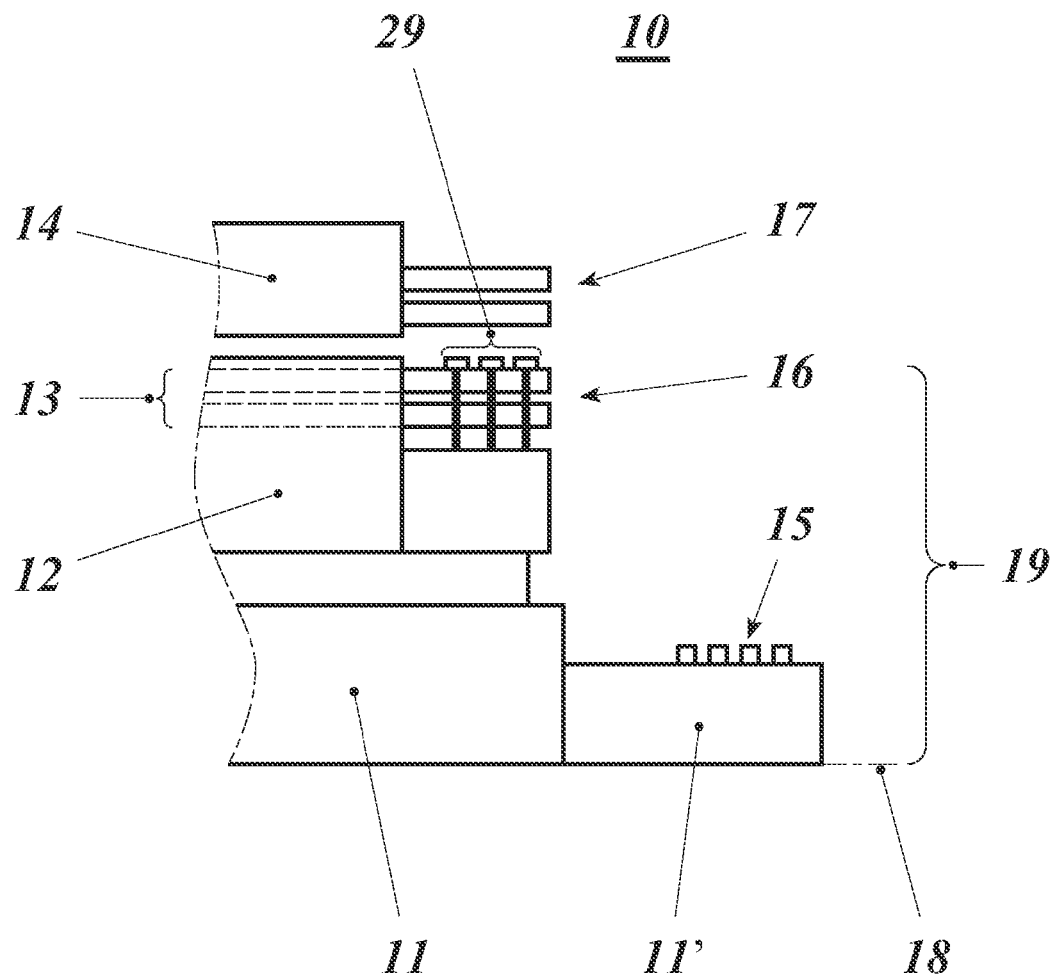
FIG. 1 shows in a simplified representation a section of an asynchronous machine with stator and rotor winding and a winding head retention system for the rotor winding head according to the prior art.
Figure 2A:
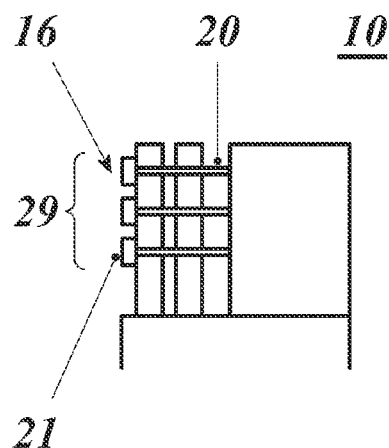
FIG. 2 shows in two part figures the enlarged section of the rotor winding head from FIG. 1 in vertical orientation (FIG. 2*a*) and two types of safety devices for the retention elements according to exemplary embodiments of the invention (FIG. 2*b*)
Figure 3A:
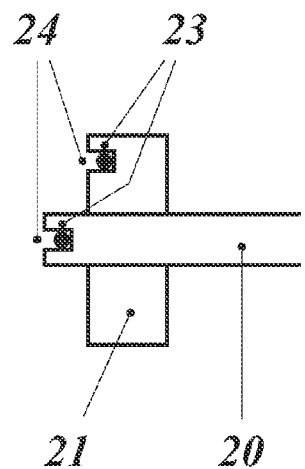
FIG. 3 shows in two part figures the section through (FIG. 3*a*) and the plan view on (FIG. 3*b*) a wire locking device of retention elements comprising threaded rods and nuts according to another exemplary embodiment of the invention.
Figure 3B:
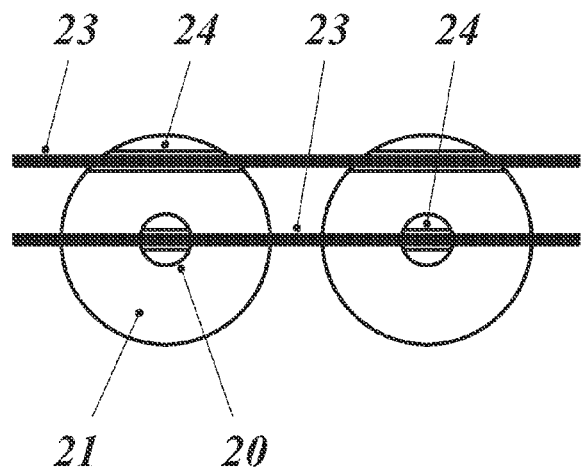

According to an embodiment of the invention, the bolts or screws of the winding head retention system 29 must be secured in the rotor winding head 16. If the retention elements according to FIG. 2*a* and FIG. 3 are threaded rods 20 with nuts 21, the nuts 21 must be secured against unintended loosening. However, if a screw or bolt should accidentally break, the parts which come free must be retained in order to prevent damage to the machine.

According to an embodiment of the invention, safeguarding against flying away can be achieved by a wire (wire locking device 23 in FIG. 2*b*) or a textile (textile locking device 22 in FIG. 2*b*) which is stretched over the screw heads or nuts 21 in a circumferential direction. In normal operation, the screws (or threaded rods 20) cannot move in the radial direction. The forces, which are absorbed by the screws (or threaded rods 20), are large, as these must be able to carry the centrifugal forces which result from the weight of the winding head 16. If a screw (or threaded rod 20) should break, only the centrifugal force of the mass of the piece of the screw which comes free acts on the safety device. This force is relatively small. For this reason, it is possible to retain a broken screw or threaded rod 20 by means of a wire or textile. A highly tear-resistant textile which is stable even at higher temperatures can be used as a suitable material for the textile or textile tape.

Figure 2B:
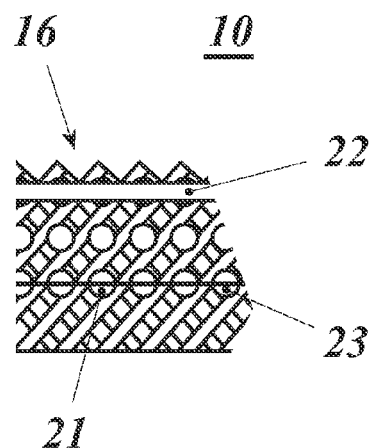

While the textile tape of the textile locking device 22 according to FIG. 2*b* can be fed over the width of the nuts 21 or screw heads, when using the wire locking device 23, it can be of advantage to provide slots 24 in which the wire locking device 23 is laid and which run in a circumferential direction in the nuts 21 or threaded rods 20 or in the screw heads according to FIG. 3. As a result of the wire running in the slots 24, the nuts 21 or threaded bolts are unable to turn. At the same time, the wire itself is safeguarded against slipping.

Figure 4:
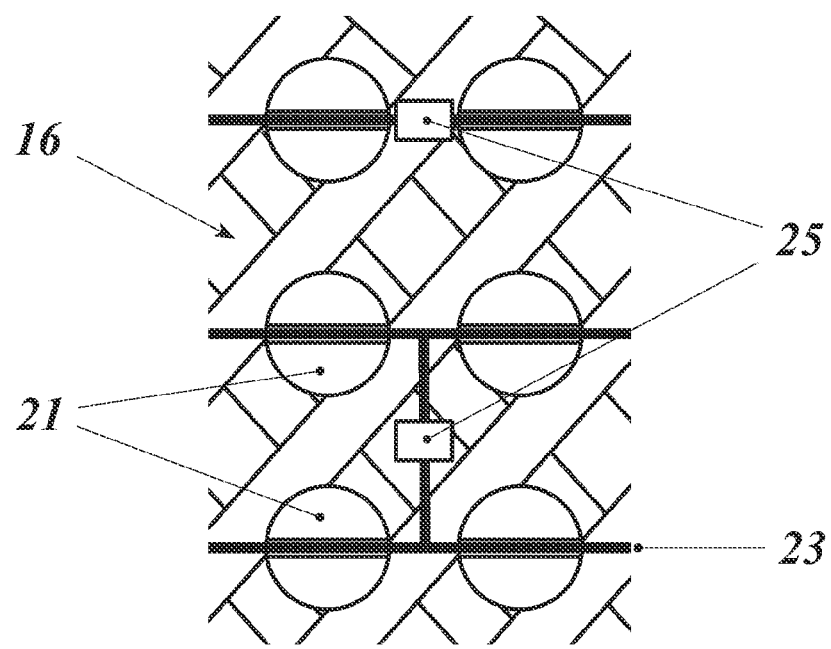
FIG. 4 shows by way of example the incorporation of monitoring means into the retention system according to another exemplary embodiment of the invention.
Figure 5:
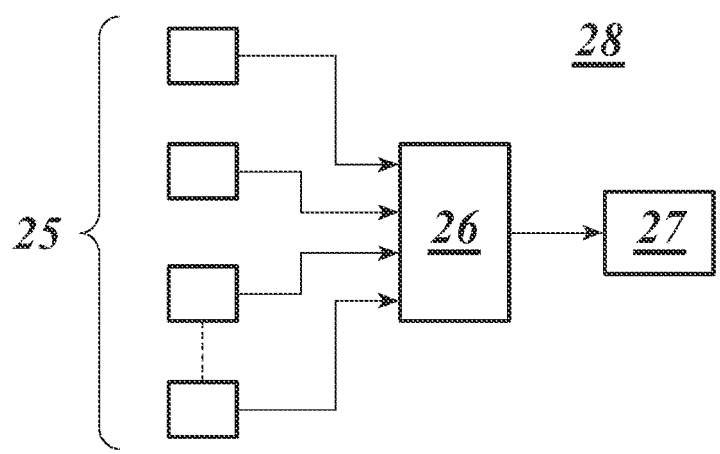
FIG. 5 shows the schematic diagram of a monitoring device which works with the monitoring means of FIG. 4.

Advantageously, monitoring can simultaneously be combined with the safeguarding of the retention system. The monitoring is used to protect the machine. It is there to detect and signal accidental breakage of the screw or bolt or an inadmissible expansion of the rotor winding head 16 so that the machine can be stopped in good time and repairs initiated. For this purpose, according to FIGS. 4 and 5, the strain (tension) in the wire or textile tape is monitored by means of a suitable electronic sensor (strain measuring device 25) (for example, by means of a load cell). If part of the screw comes loose due to a breakage, the mechanical strain in the wire (wire locking device 23) increases and can be detected. At the same time, the sensor or strain measuring device 25 can be integrated running around the circumference directly in the wire (top part in FIG. 4), or can measure the strain of two safety wires in that the sensor is arranged perpendicular to the wires (bottom part of FIG. 4). Furthermore, the wires can be fed with appropriate deflections through the crossing points of the winding bars so that the strain can be measured inside the rotor body.

The signals measured by the different sensors or strain measuring devices 25 in the rotor winding head 16 are fed to an appropriate monitoring device (28 in FIG. 5) of a central processing unit 26 where they are evaluated. If abnormal changes in the strain pattern of the safety devices of the winding head retention system 29 are detected during operation, a signal is output to and displayed on a downstream display unit 27. The signal can simultaneously be fed to a central controller for the machine where it can initiate an automatic shutdown so that the machine can be inspected in good time.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

10 electrical machine (asynchronous machine)
11 central body
11' shaft
12 rotor lamination stack
13 rotor winding
14 stator lamination stack
15 slip ring
16 rotor winding head
17 stator winding head
18 axis
19 rotor
20 threaded bolt
21 nut
22 textile locking device
23 wire locking device
24 slot
25 strain measuring device
26 processing unit
27 display unit
28 monitoring device
29 winding head retention system

What is claimed is:

1. An electrical machine configured to operate at a power range of several MVA comprising:
   a rotor configured to rotate about an axis and including a rotor winding disposed in a rotor lamination stack and having an exposed winding head outside of the rotor lamination stack, wherein the winding head includes a winding head retention system including:
      a plurality of radially oriented retention elements each including a locking device configured to secure a respective one of the retention elements against at least one of an unintentional loosening and a flying away in an event of a breakage due to centrifugal forces,
   wherein the plurality of retention elements each include at least one of a threaded rod and a threaded bolt configured to extend through the winding head in a radial direction, an outer end of the at least one of the threaded rod and the threaded bolt including one of a nut and a screw head configured to support the winding head, wherein the locking device includes a wire locking device including a wire configured to stretch over the outside of at least one of the threaded bolt, threaded rod, nut and screw head, wherein the wire locking device is stretched circumferentially and is in close contact with the outside of at least one of the threaded bolt, threaded rod, nut and screw head.

2. The electrical machine as recited in claim 1, wherein the electrical machine is an asynchronous machine.

3. An electrical machine configured to operate at a power range of several MVA comprising:

a rotor configured to rotate about an axis and including a rotor winding disposed a rotor lamination stack and having an exposed winding head outside of the rotor lamination stack, wherein the winding head in a winding head retention system including:

a plurality of radially oriented retention elements each including a locking device configured to secure a respective one of the retention elements against at least one of an unintentional loosening and a flying away in an event of a breakage due to centrifugal forces, wherein the plurality of retention elements each include at least one of a threaded rod and a threaded bolt configured to extend through the winding head in a radial direction, an outer end of the at least one of the threaded rod and the threaded bolt including one of a nut and a screw head configured to support the winding head, wherein the locking device includes a textile locking device stretched over an outside of the one of the nut and screw head.

4. The electrical machine as recited in claim 3, wherein the textile locking device includes a textile tape stretched circumferentially over the outside so as to be in close contact with the one of the nut and the screw head.

5. The electrical machine as recited in claim 1, wherein the wire locking device is insertable into a slot of each of the plurality of retention elements so as to safeguard the plurality of retention elements against twisting.

6. The electrical machine as recited in claim 1, wherein the winding head retention system includes a monitoring device configured to monitor a functioning of the winding head.

7. The electrical machine as recited in claim 6, wherein the monitoring device includes a strain measuring device configured to measure a mechanical strain of the locking device and to transmit the measured mechanical strain to a processing unit so as to evaluate the strain.

8. The electrical machine as recited in claim 3, wherein the electrical machine is an asynchronous machine.

9. The electrical machine as recited in claim 3, wherein the winding head retention system includes a monitoring device configured to monitor a functioning of the winding head.

10. The electrical machine as recited in claim 9, wherein the monitoring device includes a strain measuring device configured to measure a mechanical strain of the locking device and to transmit the measured mechanical strain to a processing unit so as to evaluate the strain.

* * * * *